US007828869B1

(12) United States Patent
Parikh et al.

(10) Patent No.: US 7,828,869 B1
(45) Date of Patent: Nov. 9, 2010

(54) SPACE-EFFECTIVE FILTER ELEMENT (75) Inventors: Chirag D. Parikh, Madison, WI (US); Kwok-Lam Ng, Madison, WI (US); Roger L. Zoch, McFarland, WI (US); Jim L. Alonzo, Verona, WI (US); Guillermo Alberto Smith, Fitchburg, WI (US); Brian W. Schwandt, Fort Atkinson, WI (US); Eric J. Rego, Verona, WI (US); J. Bruce Schelkopf, Zionsville, IN (US); Barry M. Verdegan, Stoughton, WI (US); Kelly R. Schmitz, Cottage Grove, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 419 days.

(21) Appl. No.: 11/940,729

(22) Filed: Nov. 15, 2007

Related U.S. Application Data (63) Continuation-in-part of application No. 11/940,626, filed on Nov. 15, 2007, and a continuation-in-part of application No. 11/279,849, filed on Apr. 14, 2006, now Pat. No. 7,582,130, and a continuation-in-part of application No. 11/346,679, filed on Feb. 3, 2006, and a continuation-in-part of application No. 11/230,694, filed on Sep. 20, 2005, said application No. 11/346,679 is a continuation-in-part of application No. 11/273,101, filed on Nov. 14, 2005, now Pat. No. 7,674,445, and a continuation-in-part of application No. 11/230,694, filed on Sep. 20, 2005.

(51) Int. Cl.
*B01D 46/00* (2006.01)

(52) U.S. Cl. .............................. 55/484; 55/482; 55/483; 55/490; 55/492; 55/498; 55/529

(58) Field of Classification Search ................ 55/341.1, 55/342, 342.1, 343, 350.1, 410, 428, 429, 55/483, 484, 476, 385.3, 490, 492, 498, 482, 55/529
See application file for complete search history.

(56) References Cited

U.S. PATENT DOCUMENTS 1,761,944 A    6/1930    Taylor (Continued)

FOREIGN PATENT DOCUMENTS

EP    0325854    4/1993

(Continued)

OTHER PUBLICATIONS

S. F. Moses and K. M. Ng, "*A Visual Study of the Breakdown of Emulsions in Porous Coalescers*", Chemical Engineering Science, vol. 40, No. 12; pp. 2339-2350, 1985.
Tadeusz Jaroszczyk et al., "*Chapter 10 Cartridge Filtration*", in Filtration Principles and Practices, Second Edition, Revised and Expanded, Michael Matteson and Clyde Orr, eds., Marcel Dekker, Inc., New York, 1987, p. 547.

(Continued)

*Primary Examiner*—Duane Smith
*Assistant Examiner*—Thomas Bennett McKenzie
(74) *Attorney, Agent, or Firm*—Andrus, Sceales, Starke & Sawall, LLP; J. Bruce Schelkopf (57) ABSTRACT

A filter element is provided with a space-effective construction facilitating efficient space utilization in applications of constrained space requirements.

38 Claims, 7 Drawing Sheets

U.S. PATENT DOCUMENTS

| | | | |
|---|---|---|---|
| 2,569,316 A | 9/1951 | Jerman | |
| 2,608,376 A | 8/1952 | Adams | |
| 2,609,835 A | 9/1952 | Horvay | |
| 2,646,071 A | 7/1953 | Wagner | |
| 2,667,895 A | 2/1954 | Pool et al. | |
| 2,949,931 A | 8/1960 | Ruppright | |
| 3,026,903 A | 3/1962 | Roach | |
| 3,217,736 A | 11/1965 | Voss | |
| 3,495,620 A | 2/1970 | Raimondi et al. | |
| 3,645,398 A | 2/1972 | Flocco | |
| 3,755,527 A | 8/1973 | Keller | |
| 3,841,953 A | 10/1974 | Lohkamp et al. | |
| 3,904,798 A | 9/1975 | Vogt et al. | |
| 3,949,130 A | 4/1976 | Sabee et al. | |
| 3,971,373 A | 7/1976 | Braun | |
| 3,972,759 A | 8/1976 | Buntin | |
| 3,978,185 A | 8/1976 | Buntin et al. | |
| 4,048,364 A | 9/1977 | Harding et al. | |
| 4,078,124 A | 3/1978 | Prentice | |
| 4,192,919 A | 3/1980 | Raghavachari | |
| 4,253,954 A | 3/1981 | Midkiff et al. | |
| 4,275,759 A | 6/1981 | Huang | |
| 4,282,097 A | 8/1981 | Kuepper et al. | |
| 4,401,093 A | 8/1983 | Gates, Jr. et al. | |
| 4,416,782 A | 11/1983 | Kerres | |
| 4,524,000 A | 6/1985 | Clayfield et al. | |
| 4,668,393 A | 5/1987 | Stone | |
| 4,689,058 A | 8/1987 | Vogt et al. | |
| 4,726,901 A | 2/1988 | Pall et al. | |
| 4,792,113 A | 12/1988 | Eidsmore | |
| 4,856,139 A * | 8/1989 | Matthews et al. | 15/350 |
| 4,859,348 A | 8/1989 | Jusaitis et al. | |
| 4,874,012 A | 10/1989 | Velie | |
| 4,874,399 A | 10/1989 | Reed et al. | |
| 4,878,929 A | 11/1989 | Tofsland et al. | |
| 4,892,667 A | 1/1990 | Parker, III et al. | |
| 4,993,517 A | 2/1991 | Leipelt et al. | |
| 4,995,974 A | 2/1991 | Lorey et al. | |
| 5,061,170 A | 10/1991 | Allen et al. | |
| 5,075,068 A | 12/1991 | Milligan et al. | |
| 5,122,048 A | 6/1992 | Deeds | |
| 5,129,371 A | 7/1992 | Rosalik, Jr. | |
| 5,145,689 A | 9/1992 | Allen et al. | |
| 5,174,907 A | 12/1992 | Chown et al. | |
| 5,201,301 A | 4/1993 | Re | |
| 5,205,848 A | 4/1993 | Blanc et al. | |
| 5,227,172 A | 7/1993 | Deeds | |
| 5,236,641 A | 8/1993 | Allen et al. | |
| 5,254,297 A | 10/1993 | Deeds | |
| 5,269,670 A | 12/1993 | Allen et al. | |
| 5,273,565 A | 12/1993 | Milligan et al. | |
| 5,296,061 A | 3/1994 | Ando et al. | |
| 5,306,321 A | 4/1994 | Osendorf | |
| 5,320,136 A | 6/1994 | Morris et al. | |
| 5,329,913 A | 7/1994 | Suzuki et al. | |
| 5,340,479 A | 8/1994 | Szczepanski et al. | |
| 5,401,458 A | 3/1995 | Wadsworth et al. | |
| 5,409,642 A | 4/1995 | Allen et al. | |
| 5,411,576 A | 5/1995 | Jones et al. | |
| 5,419,953 A | 5/1995 | Chapman | |
| 5,427,597 A | 6/1995 | Osendorf | |
| 5,433,763 A * | 7/1995 | Shagott et al. | 55/323 |
| 5,464,461 A * | 11/1995 | Whitson et al. | 55/480 |
| 5,470,663 A | 11/1995 | Wadsworth et al. | |
| 5,472,481 A | 12/1995 | Jones et al. | |
| 5,480,547 A | 1/1996 | Williamson et al. | |
| 5,501,872 A | 3/1996 | Allen et al. | |
| 5,564,401 A | 10/1996 | Dickson | |
| 5,591,335 A | 1/1997 | Barboza et al. | |
| 5,605,706 A | 2/1997 | Allen et al. | |
| 5,618,566 A | 4/1997 | Allen et al. | |
| 5,667,562 A | 9/1997 | Midkiff | |
| 5,672,232 A | 9/1997 | Clack | |
| 5,681,469 A | 10/1997 | Barboza et al. | |
| 5,695,637 A | 12/1997 | Jiang et al. | |
| 5,733,581 A | 3/1998 | Barboza et al. | |
| 5,800,706 A | 9/1998 | Fischer | |
| 5,865,863 A * | 2/1999 | DeSousa et al. | 55/385.3 |
| 5,900,032 A * | 5/1999 | Wang | 55/385.3 |
| 5,913,851 A | 6/1999 | Gryskiewicz et al. | |
| 5,972,063 A | 10/1999 | Dudrey et al. | |
| 5,994,482 A | 11/1999 | Georgellis et al. | |
| 6,019,809 A | 2/2000 | Kahlbaugh et al. | |
| 6,073,618 A | 6/2000 | Sanders et al. | |
| 6,117,322 A | 9/2000 | Miller et al. | |
| 6,146,580 A | 11/2000 | Bontaites, Jr. | |
| 6,171,369 B1 | 1/2001 | Schultink et al. | |
| 6,179,890 B1 | 1/2001 | Ramos et al. | |
| 6,235,195 B1 * | 5/2001 | Tokar | 210/238 |
| 6,247,463 B1 | 6/2001 | Fedorowicz et al. | |
| 6,279,556 B1 | 8/2001 | Busen et al. | |
| 6,290,738 B1 | 9/2001 | Holm | |
| 6,293,268 B1 | 9/2001 | Mammarella | |
| 6,314,344 B1 | 11/2001 | Sauer et al. | |
| 6,315,805 B1 | 11/2001 | Strauss | |
| 6,319,402 B1 | 11/2001 | Schwandt et al. | |
| 6,342,283 B1 | 1/2002 | Mozelack et al. | |
| 6,354,283 B1 | 3/2002 | Hawkins et al. | |
| 6,358,417 B1 | 3/2002 | Aune et al. | |
| 6,387,141 B1 | 5/2002 | Hollingsworth et al. | |
| 6,387,144 B1 | 5/2002 | Jaroszczyk et al. | |
| 6,402,798 B1 | 6/2002 | Kallsen et al. | |
| 6,402,951 B1 | 6/2002 | Wilson et al. | |
| 6,418,918 B2 | 7/2002 | Mammarella | |
| 6,422,396 B1 | 7/2002 | Li et al. | |
| 6,423,227 B1 | 7/2002 | Allen et al. | |
| 6,432,175 B1 | 8/2002 | Jones et al. | |
| 6,478,018 B2 | 11/2002 | Fedorowicz et al. | |
| 6,478,019 B2 | 11/2002 | Fedorowicz et al. | |
| 6,482,247 B2 * | 11/2002 | Jaroszczyk et al. | 55/484 |
| 6,488,801 B1 | 12/2002 | Bodaghi et al. | |
| 6,505,615 B2 | 1/2003 | Pietschner | |
| 6,521,555 B1 | 2/2003 | Bodaghi et al. | |
| 6,533,712 B1 | 3/2003 | Miller et al. | |
| 6,544,310 B2 | 4/2003 | Badeau et al. | |
| 6,568,540 B1 | 5/2003 | Holzmann et al. | |
| 6,576,045 B2 | 6/2003 | Liu et al. | |
| 6,613,268 B2 | 9/2003 | Haynes et al. | |
| 6,626,163 B1 | 9/2003 | Busen et al. | |
| 6,662,842 B2 | 12/2003 | Mozelack et al. | |
| 6,684,864 B1 | 2/2004 | Busen et al. | |
| 6,736,274 B2 | 5/2004 | Tremblay et al. | |
| 6,811,588 B2 | 11/2004 | Niakin | |
| 6,838,402 B2 | 1/2005 | Harris et al. | |
| 6,840,973 B2 * | 1/2005 | Kuji et al. | 55/385.3 |
| 6,860,917 B2 | 3/2005 | Henrichsen et al. | |
| 6,872,431 B2 | 3/2005 | Kahlbaugh et al. | |
| 6,916,395 B2 | 7/2005 | Aune et al. | |
| 6,932,923 B2 | 8/2005 | Nguyen | |
| 6,938,781 B2 | 9/2005 | Aune et al. | |
| 6,989,193 B2 | 1/2006 | Haile et al. | |
| 7,080,636 B2 | 7/2006 | Knaus et al. | |
| 7,152,589 B2 | 12/2006 | Ekeroth et al. | |
| 7,156,901 B2 | 1/2007 | Hallgren et al. | |
| 7,185,643 B2 | 3/2007 | Gronberg et al. | |
| 7,238,216 B2 | 7/2007 | Malgorn et al. | |
| 2002/0046656 A1 | 4/2002 | Benson et al. | |
| 2002/0069625 A1 * | 6/2002 | Stass | 55/385.3 |
| 2002/0070471 A1 | 6/2002 | Lee | |
| 2002/0073667 A1 | 6/2002 | Barris et al. | |
| 2002/0092423 A1 | 7/2002 | Gillingham et al. | |
| 2002/0187701 A1 | 12/2002 | Healey | |
| 2003/0010002 A1 | 1/2003 | Johnson et al. | |
| 2003/0126841 A1 * | 7/2003 | Pettipiece | 55/385.3 |

| | | | |
|---|---|---|---|
| 2003/0203696 A1 | 10/2003 | Healey | |
| 2004/0173097 A1* | 9/2004 | Engelland et al. | 95/273 |
| 2005/0082238 A1 | 4/2005 | Larson | |
| 2005/0178268 A1* | 8/2005 | Beier | 95/286 |
| 2006/0081229 A1 | 4/2006 | Gronberg et al. | |
| 2007/0039300 A1 | 2/2007 | Kahlbaugh et al. | |

FOREIGN PATENT DOCUMENTS

| | | |
|---|---|---|
| EP | 0428400 | 6/1995 |
| EP | 0682557 | 4/1997 |
| EP | 0616831 | 6/1999 |
| EP | 0960645 | 2/2000 |
| EP | 1270771 | 1/2003 |
| EP | 1198280 | 6/2003 |
| EP | 1173269 | 7/2003 |
| EP | 1050331 | 12/2003 |
| EP | 1133342 | 1/2004 |
| EP | 01048335 | 4/2005 |
| GB | 02015253 | 9/1979 |
| GB | 02194255 | 3/1988 |
| JP | 11-036169 | 2/1999 |
| PL | 172113 | 4/1995 |
| PL | 186112 | 9/1999 |
| WO | WO-95/13856 | 5/1995 |
| WO | WO-97/39817 | 10/1997 |
| WO | WO-00/29656 | 5/2000 |
| WO | WO-01/42549 | 6/2001 |
| WO | WO-02/20133 | 3/2002 |
| WO | WO-02/20668 | 3/2002 |

OTHER PUBLICATIONS

L. Spielman et al., "*Progress in Induced Coalescence and a New theoretical Framework for Coalescence by Porous Media*", Flow through Porous Media, R. Nunge, Chairman, ACS Publications, Washington, D.C., 1970.

L. Spielman et al., "*Theory of Coalescence by Flow through Porous Media*", Ind. Eng. Chem. Fundamentals, 11:66-72, 1972a.

L. Spielman et al., "*Experiments in Coalescence by Flow through Fibrous Mats*", Ind. Eng. Chem. Fundamentals, 11:7383, 1972b.

L. Spielman et al., "*Coalescence in Oil-in-Water Suspensions by Flow Through Porous Media*", Ind. Eng. Chem. Fundamentals, 16:272-282, 1977.

* cited by examiner

SPACE-EFFECTIVE FILTER ELEMENT

CROSS-REFERENCE TO RELATED APPLICATIONS

This present application is a continuation-in-part of application Ser. No. 11/940,626, filed Nov. 15, 2007, and a continuation-in-part of application Ser. No. 11/279,849, filed Apr. 14, 2006, now U.S. Pat. No. 7,582,130, and a continuation-in-part of application Ser. No. 11/346,679, filed Feb. 3, 2006, and a continuation-in-part of application Ser. No. 11/230,694, filed Sep. 20, 2005. Application Ser. No. 11/346,679, filed Feb. 3, 2006 is a continuation-in-part of application Ser. No. 11/273,101, filed Nov. 14, 2005, now U.S. Pat. No. 7,674,445, and a continuation-in-part of application Ser. No. 11/230,694 filed Sep. 20, 2005.

BACKGROUND AND SUMMARY

The invention relates to filter elements, including effective utilization of limited available space.

The invention arose during continuing development efforts directed toward space-effective filter elements utilizing limited available space. For example, in internal combustion engine crankcase ventilation filters, only a limited underhood space is available in the engine compartment. The present system has broader application and may be used in various implementations.

DETAILED DESCRIPTION

Parent '626 Application

Figure 1:
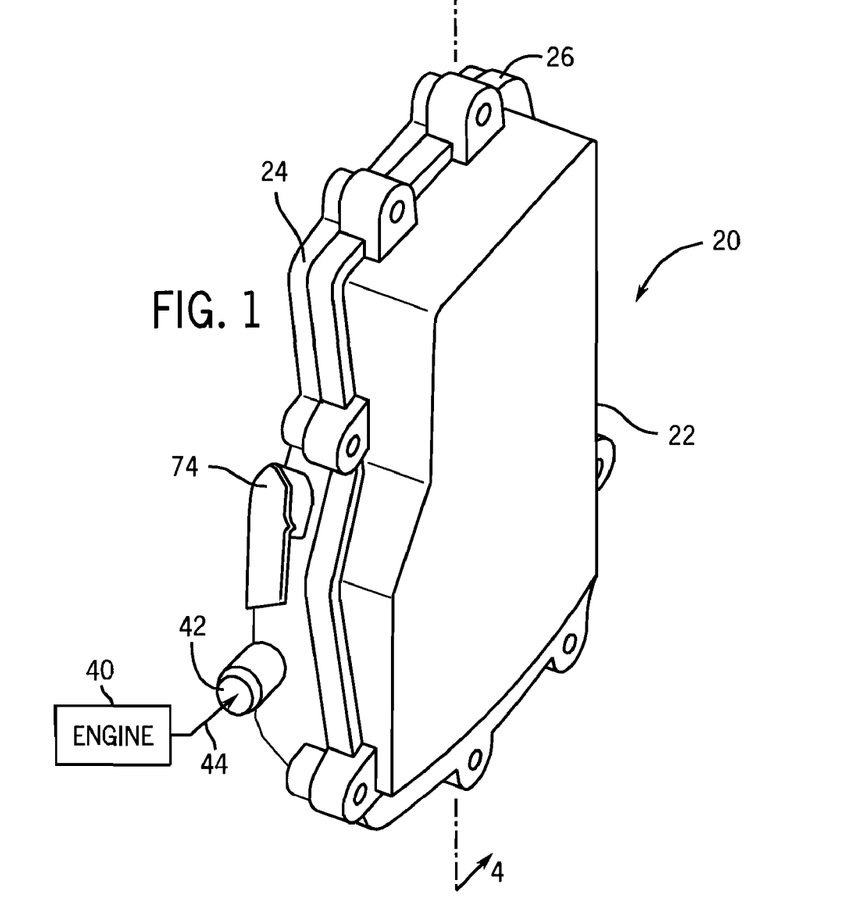
FIG. 1 is a perspective assembled view of a filter for use in accordance with the invention.
Figure 2:
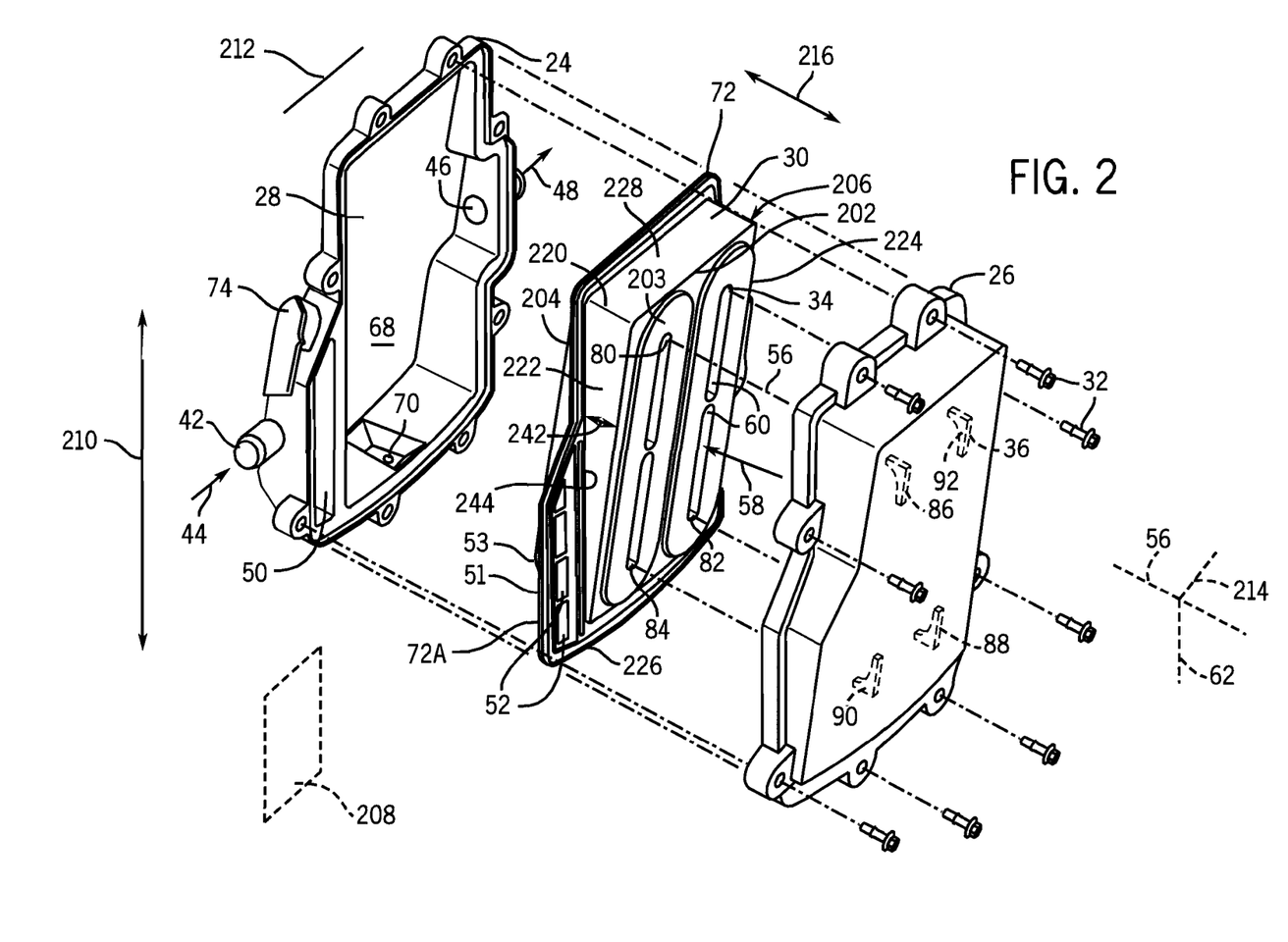
FIG. 2 is an exploded perspective view of the structure of FIG. 1.

FIG. 1 shows an internal combustion engine crankcase ventilation filter 20 including a substantially planar low profile housing 22 having a mating base 24 and cover 26 defining a coalescing filter chamber 28, FIG. 2, retaining a coalescer filter element 30 when the base and cover are mated to each other, e.g. in assembled condition by mounting bolts 32. Filter element 30 and at least one of the cover and the base, preferably cover 26, have respective first and second detents 34 and 36 disabling mating and mounting of base 24 and cover 26 to each other with coalescer filter element 30 retained in coalescing filter chamber 28 unless the coalescer filter element 30 has the noted first detent 34 complementarily interacting with the noted second detent 36.

Housing 22 has a flow path therethrough for crankcase gas from engine 40 extending from a housing air-oil inlet 42 as shown at arrow 44 then through coalescer filter element 30 then to a housing air outlet 46 as shown at arrow 48. The flow at inlet 42 enters an entry plenum 50 in base 24 and then flows through openings or windows 52 in a side flange 51 of the frame 53 of filter element 30 and then into upstream plenum 54 between cover 26 and filter element 30 and then along an axial direction 56 as shown at arrow 58, FIG. 2, into slots 60 of filter element 30 then laterally outwardly along lateral direction 62 as shown at arrow 64, FIG. 4, through coalescing filter media 66 into downstream plenum 68, for exit of air at housing air outlet 46, and for drainage of separated oil at housing drain oil outlet 70. The peripheral flange of the frame of filter element 30 is sealed along diagonal gasket 72 engaged between base 24 and cover 26 upon tightening of bolts 32. A pressure relief valve 74 may be provided at inlet or entry plenum 50 for alternate or bypass flow in the event filter element 30 clogs or otherwise becomes excessively restrictive. Coalescer filter element 30 has an upstream face 76, FIG. 4, receiving the air-oil mixture along the noted flow path, and has a downstream face 78 along which separated oil coalesces and from which separated air is discharged along the noted flow path. The flow path extends axially at 58 along axial direction 56 along upstream face 76, and then extends laterally at 64 along lateral direction 62 from upstream face 76 to downstream face 78. The plane of the substantially planar low profile housing 20 lies along the noted lateral direction 62 and requires only a small space for mounting in an engine compartment. The housing is preferably mounted vertically, or at least with drain outlet 70 at a lower downwardly disposed orientation. Coalescer filter element 30 extends along an extended lateral direction 62 in a racetrack shape at coalescing filter element 66 and has a hollow interior having a height extending along axial direction 56, and an extended longitudinal length extending along lateral direction 62 and defining the respective longitudinal slot 60.

Figure 3:
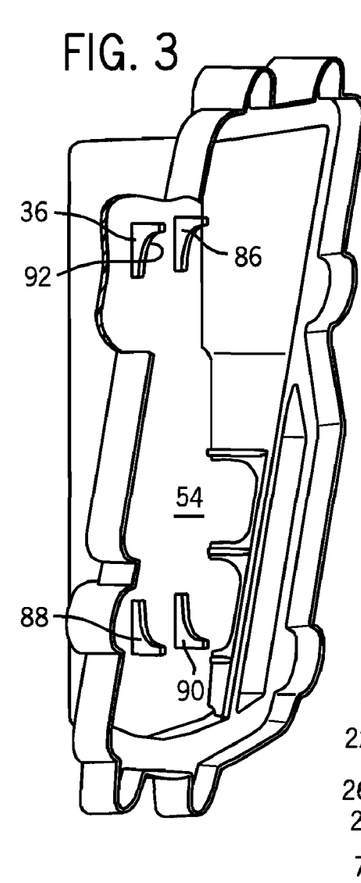
FIG. 3 is a perspective view of a component of FIG. 2 from a different angle.

The noted first detent 34 is preferably provided by slot 60 of the filter element. Second detent 36 is attached to cover 26, e.g. adhesively bonded thereto or integrally formed therewith, etc., and extends axially along axial direction 56 into slot 60. In the preferred embodiment, in addition to detent 34, additional detents are provided as shown at 80, 82, 84, each provided by a respective slot 60, and in addition to the detent at tab 36, additional detents are provided as shown at tabs 86, 88, 90, attached to cover 26. The detents are at upstream face 76 of the coalescing filter media 66 of filter element 30 and in the path of and impacted by the air-oil mixture. Detents 36, 86, 88, 90 have curved arcuate surfaces in axial cross-section, for example as shown at 92, FIGS. 2, 3, guiding and directing air-oil mixture flow therealong into slot 60.

Upon servicing, only an authorized replacement coalescer filter element can be used for internal combustion engine crankcase ventilation filter 20. The replacement coalescer filter element must have one or more detents 34, 80, 82, 84 complementarily interacting with one or more respective detents 36, 86, 88, 90 upon mating of base 24 and cover 26 to each other. Mating of the base and cover to each other with a replacement coalescer filter element retained in coalescing filter chamber 28 is disabled unless the replacement coalescer filter element has the noted one or more detents 34, 80, 82, 84 complementarily interacting with the noted one or more detents 36, 86, 88, 90 in coalescing filter chamber 28.

A method is provided for servicing internal combustion engine crankcase ventilation filter 20, including providing a substantially planar low profile housing 22 having a mating base 24 and cover 26 defining coalescing filter chamber 28 retaining coalescer filter element 30 when base 24 and cover 26 are mated to each other. The method includes providing the coalescer filter element 30 and at least a selected one of the cover and base, preferably cover 26, with respective complemental first and second detents 34 and 36, and disabling mating of base 24 and cover 26 to each other with coalescer filter element 30 retained in coalescing filter chamber 28 unless a coalescer filter element is selected having first detent 34 complementally interacting with second detent 36, and preferably with each of detents 34, 80, 82, 84 complementally interacting with respective detents 36, 86, 88, 90. First detent 34 is provided at one of the noted faces 76 and 78 of the filter element, preferably upstream face 76. Second detent 36 extends proximate face 76 and interfaces with detent 34 in keyed relation. The coalescer filter element is selected to have detent 34 complementally interact with detent 36 by interfacing therewith in keyed relation, and likewise for remaining detent pairs 80 and 86, 82 and 88, 84 and 90. The method further includes preventing the noted mating of base 24 and cover 26 in the absence of the noted interfacing in keyed relation of the noted detents. The method further includes selecting the noted selected one of the cover and base, preferably cover 26, to have the second detent 36 complementally interact with first detent 34 by interfacing therewith in keyed relation and likewise for the remaining noted detent pairs, and preventing the noted mating of base 24 and cover 26 in the absence of the noted interfacing in keyed relation of the detents. The method further includes assigning a specified first detent location along coalescer filter element 30, and locating first detent 34 at the first detent location such that detent 34 has a given first detent location relative to coalescer filter element 30, and likewise for remaining detents 80, 82, 84. The method further includes installing the coalescer filter element 30 by placing the coalescer filter element in coalescing filter chamber 28 at a specified element location therein such that detent 34 is located at a first detent position in coalescing filter chamber 28, and likewise for detents 80, 82, 84. The method further includes assigning a specified second detent location along the selected one of the cover and base, preferably cover 26, and locating detent 36 at the noted second detent location such that detent 36 has a given second detent location relative to the cover 26. The method further includes assembling cover 26 and base 24 in the noted mating relation such that detent 36 is located at a second detent position in coalescing filter chamber 28 and such that the noted first and second detent positions align in coalescing filter chamber 28, and the first and second detents 34 and 36 interface in keyed relation, and likewise for remaining detent pairs 80 and 86, 82 and 88, 84 and 90.

FIGS. 6-9 show a further embodiment. Internal combustion engine crankcase ventilation filter 102 includes a substantially planar low profile housing 104 having a mating base 106 and cover 108 defining a coalescing filter chamber 110 retaining a coalescer filter element 112 when the base and cover are mated to each other in assembled condition by mounting bolts 114. Coalescer filter element 112 and at least a selected one of the cover and base, preferably cover 108, have respective complemental first and second detents 116 and 118 disabling mating of base 106 and cover 108 to each other with coalescer filter element 112 retained in coalescing filter chamber 110 unless the coalescer filter element has first detent 116 complementally interacting with second detent 118.

Housing 104 has a flow path therethrough for crankcase gas from engine 120 extending from housing air-oil inlet 122 as shown at arrow 124 then through coalescer filter element 112 then to housing air outlet 126 as shown at arrow 128. The flow path from inlet 122 extends through port 130 in the frame 132 of filter element 112, which port 130 may includes an inertial impactor separator for pre-separation of oil from the crankcase gas stream, which pre-separated oil may collect in well 134 having an opening at the bottom thereof passing oil to a first oil outlet drain 136 in base 106 for drainage at outlet port 138. The crankcase gas flow from transfer port 130, with or without pre-separation, passes into upstream plenum 140 between cover 108 and filter element 112 and then passes axially downwardly in FIG. 7 along axial direction 142 as shown at arrow 144 into the hollow interior spaces of the coalescing filter media of the filter element at slots 146 and then laterally along lateral direction 148 as shown at arrow 150, FIG. 9, through the coalescing filter media 152 to downstream plenum 154 for exit of air at air outlet 126 as shown at arrow 128, and exit of coalesced oil at oil outlet 156. The outer peripheral flange of the frame of filter element 112 is sealed at diagonally extending gasket 158 engaged between cover 108 and base 106. Housing 104 sits generally horizontally in the engine compartment, e.g. on top of a cylinder head, or at a given angle with drains 138, 156 preferably at a lower location pointing at least partially downwardly. Coalescing filter media 152 of filter element 112 has an upstream face 160 receiving the air-oil mixture along the noted flow path, and has a downstream face 162 along which separated oil coalesces and from which separated air is discharged along the noted flow path. The flow path extends axially as shown at arrow 144 along axial direction 142 along upstream face 160 of the filter media, and then extends laterally as shown at arrow 150 along lateral direction 148 from upstream face 160 to downstream face 162. The plane of substantially planar low profile housing 104 lies along lateral direction 148. Coalescer filter element 112 at filter media 152 extends along an extended lateral direction 164 in a racetrack shape having one or more hollow interiors 146 each having a height extending along axial direction 142, and an extended longitudinal length extending along lateral direction 164 and defining the respective slot 146.

First detent 116 is provided by the noted slot 146. Second detent 118 is provided by a tab attached to the noted selected one of the cover and base, preferably cover 106, e.g. adhesively bonded thereto or integrally formed therewith, etc., and extending axially into slot 146. In the preferred embodiment, filter element 112 has the noted detent 116 and additionally has further detents 166, 168, 170 provided by respective slots. Further in the preferred embodiment, cover 106 has detent 118 provided by the noted tab attached thereto and additionally has detent tabs 172, 174, 176 attached thereto, and extending axially into respective slots providing respective detents 116, 166, 168, 170. Detents 116 and 118 are at upstream face 160 of the coalescing filter media 152 of the filter element and in the path of and impacted by the air-oil mixture, as are respective detent pairs 166 and 172, 168 and 174, 170 and 176. Detent 118 has a curved arcuate surface in axial cross-section guiding and directing air-oil mixture therealong into slot 146. The remaining detents provided by the respective tabs 172, 174, 176 are comparable.

In the embodiment of FIGS. 6-9, in addition to the noted first and second detents 116 and 118, a third detent 180 on coalescer filter element 112 is laterally spaced from first detent 116 and also laterally spaced from each of the noted upstream and downstream faces 160 and 162 of coalescing filter media 152 of the filter element. A fourth detent 182 is provided on a given one of the cover and base, preferably cover 108, and is laterally spaced from second detent 118 and complementally interacts with third detent 180 upon mating of cover 108 and base 106 in assembled condition by mounting bolts 114. First detent 116, second detent 118, third detent 180, and fourth detent 182 prevent mating of base 106 and cover 108 to each other with coalescer filter element 112 retained in coalescing filter chamber 110 unless the coalescer filter element has both: a) the first detent 116 complementally interacting with second detent 118 extending axially thereinto; and b) third detent 180 complementally interacting with fourth detent 182.

Figure 7:
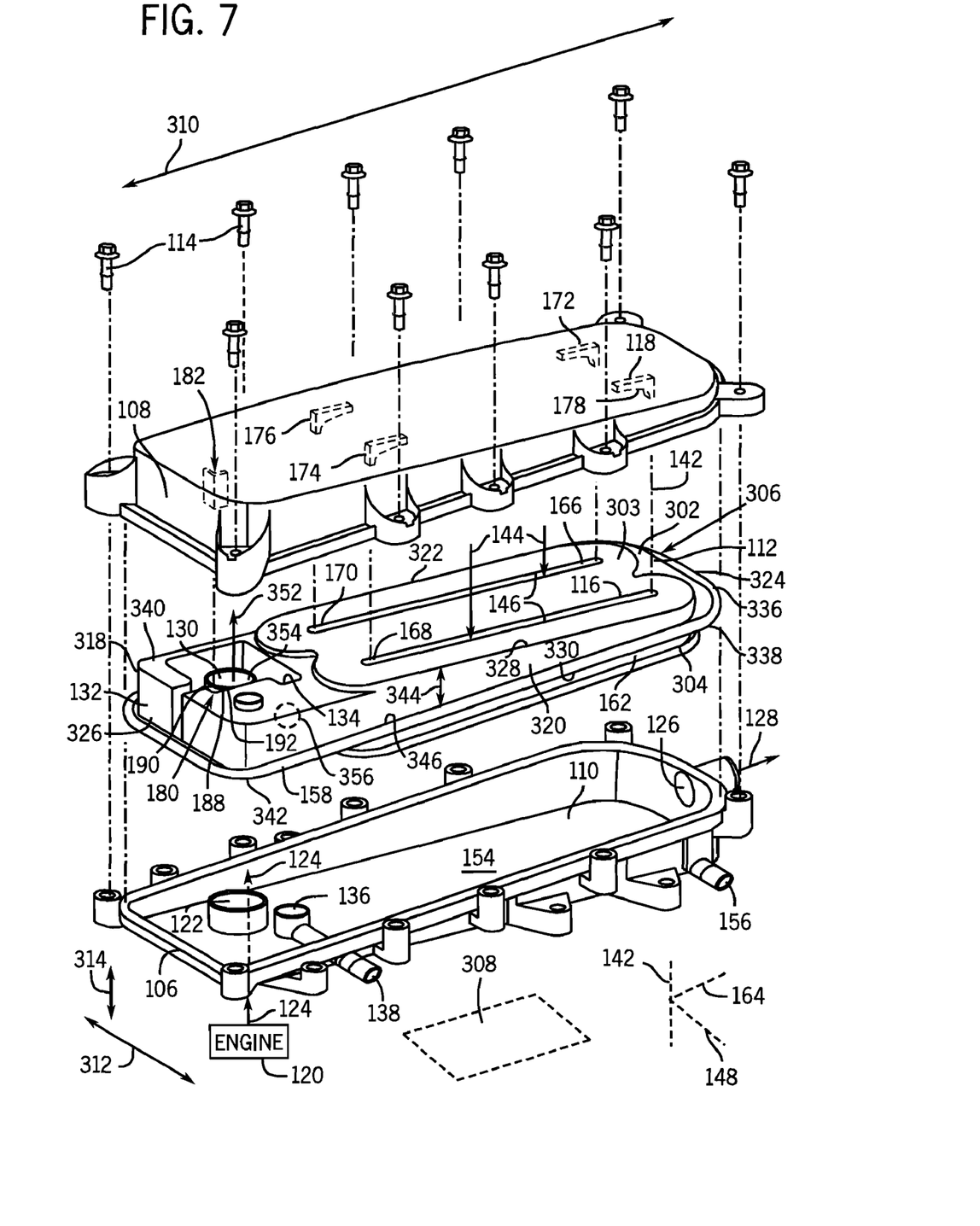
FIG. 7 is an exploded perspective view of the structure of FIG. 6.
Figure 8:
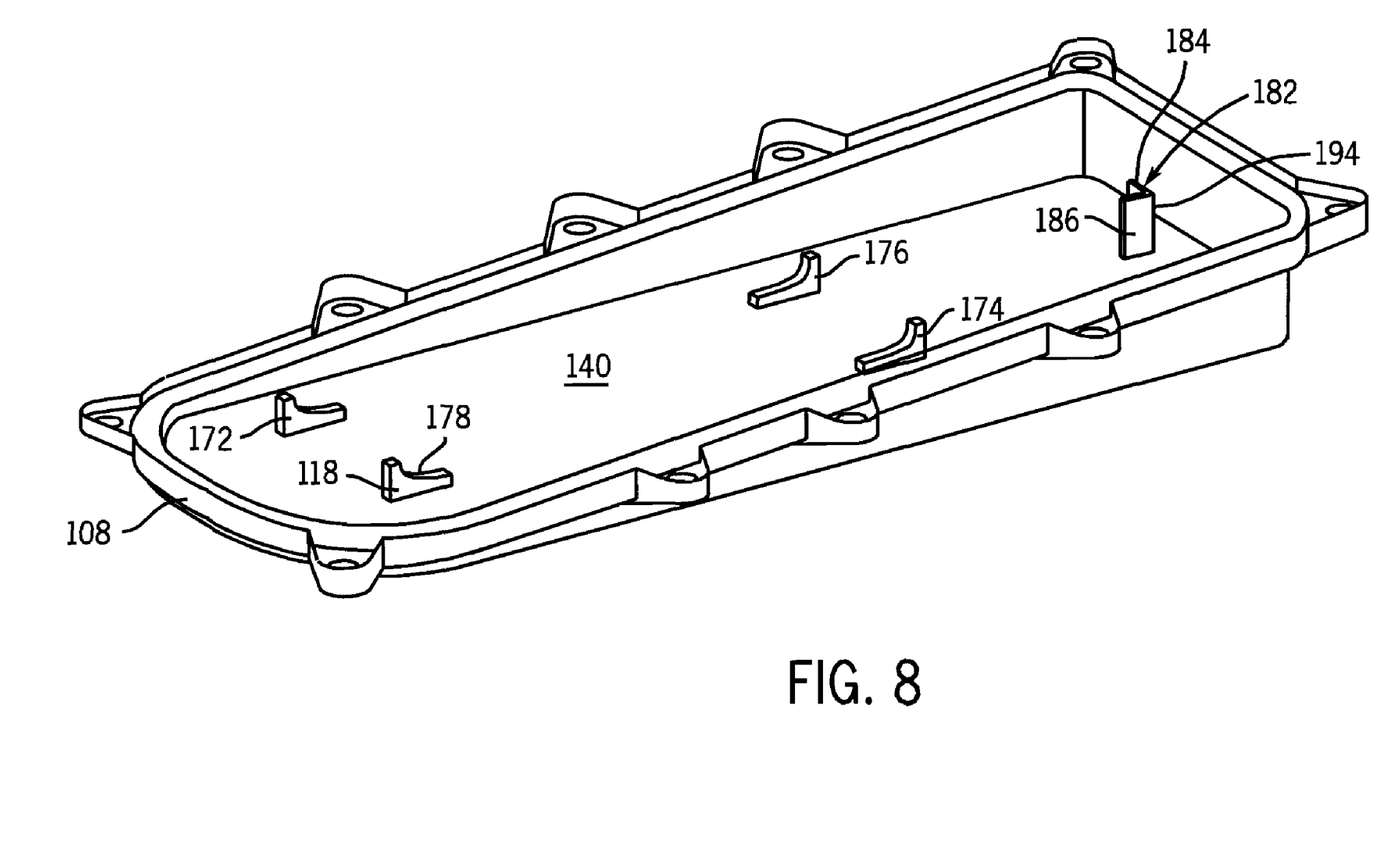
FIG. 8 is a perspective view of a component of FIG. 7 from a different angle.

The noted fourth detent 182, FIGS. 7, 8, is preferably provided by an axially extending tab attached to cover 108, e.g. adhesively bonded thereto or integrally formed therewith, etc. The noted third detent 180 is preferably provided by a retaining wall forming well 134 and receiving tab 182 extending axially therealong. Tab 182 has an L-shape in lateral cross-section, the L-shape having first and second legs 184 and 186. The noted retaining wall at 180 is provided by a corner segment 188 of the well 134 having first and second wall sections 190 and 192 meeting at a junction at 188 and complementally receiving at least one of the noted legs 184 and 186. In the preferred embodiment, legs 184 and 186 meet at a joint 194 extending axially therealong along axial direction 142. First leg 184 extends axially along first wall section 190. Second leg 186 extends axially along second wall section 192. Junction 188 receives joint 194 extending axially therealong.

For servicing, an authorized replacement coalescer filter element 112 must be used for the internal combustion engine crankcase ventilation filter 102. The replacement coalescer filter element must have first detent 116 complementally interacting with second detent 118 upon mating of base 106 and cover 108 to each other. The system disables the noted mating of base 106 and cover 108 to each other with replacement coalescer filter element 112 retained in coalescing filter chamber 110 unless the replacement coalescer filter element has the noted first detent 116 complementally interacting with the noted second detent 118 in the coalescing filter chamber. In the preferred embodiment, other detent pair conditions must be met, namely other detent pairs must also complementally interact with each other, namely detent pairs 166 and 172, 168 and 174, 170 and 176, 180 and 182.

A method is provided for servicing internal combustion engine crankcase ventilation filter 102, including providing a substantially planar low profile housing 104 having a mating base 106 and cover 108 defining a coalescing filter chamber 110 retaining a coalescer filter element 112 when the base and cover are mated to each other in assembled condition by mounting bolts 114. The method includes providing the coalescer filter element 112 and at least one of the cover and base, preferably cover 108, with respective complemental first and second detents 116 and 118, and disabling mating of base 106 and cover 108 to each other with coalescer filter element 112 retained in coalescing filter chamber 110 unless a coalescer filter element is selected having first detent 116 complementally interacting with second detent 118. The method includes selecting the coalescer filter element to have first detent 116 complementally interact with second detent 118 by interfacing therewith in keyed relation. The method includes preventing the mating of base 106 and cover 108 in the absence of the noted interfacing in keyed relation of the first and second detents 116 and 118. The method includes selecting the noted selected one of the cover and base, preferably cover 108, to have the noted second detent 118 complementally interact with the first detent 116 by interfacing therewith in keyed relation. The method includes preventing the noted mating of base 106 and cover 108 in the absence of the noted interfacing in keyed relation of detents 116 and 118. In the preferred embodiment, the method includes providing a third detent such as 180 on the coalescer filter element 112, and providing a fourth detent such as 182 on a given one of the cover and base, preferably cover 108. In such embodiment, the method includes disabling the mating of base 106 and cover 108 to each other with the coalescer filter element 112 retained in coalescing filter chamber 110 unless a coalescer filter element is selected having both: a) the first detent 116 complementally interacting with the second detent 118; and b) the third detent 180 complementally interacting with the fourth detent 182. The method includes assigning a specified first detent location along coalescer filter element 112, and locating the first detent 116 at the first detent location such that the first detent 116 has a given first detent location relative to coalescer filter element 112. The method includes installing coalescer filter element 112 by placing the coalescer filter element in the coalescing filter chamber 110 at a specified element location therein such that the first detent 116 is located at a first detent position in coalescing filter chamber 110. The method includes assigning a specified second detent location along the noted selected one of the cover and base, preferably cover 108, and locating the second detent 118 at the second detent location such that the second detent 118 has a given second detent location relative to cover 108. The method includes assembling cover 106 and base 108 in mating relation such that the second detent 118 is located at the noted second detent position in coalescing filter chamber 110 and such that the noted first and second detent positions align in coalescing filter chamber 110, and the first and second detents 116 and 118 interface in keyed relation.

The structure and methodology herein may be used beyond internal combustion engine crankcase ventilation filter applications to other filter applications and servicing and replacement filter elements therefor. Other embodiments are envisioned that may include other possible features, such as complementally interacting protuberances, keyed interlocking fingers, male-female connections, plastic pegs, prongs, hooks, clamping structures, integrated interlocking edges, and other structural devices which receivably interact with one another, as well as other structures providing the functions herein or functional equivalents thereof.

Present Application

Figure 4:
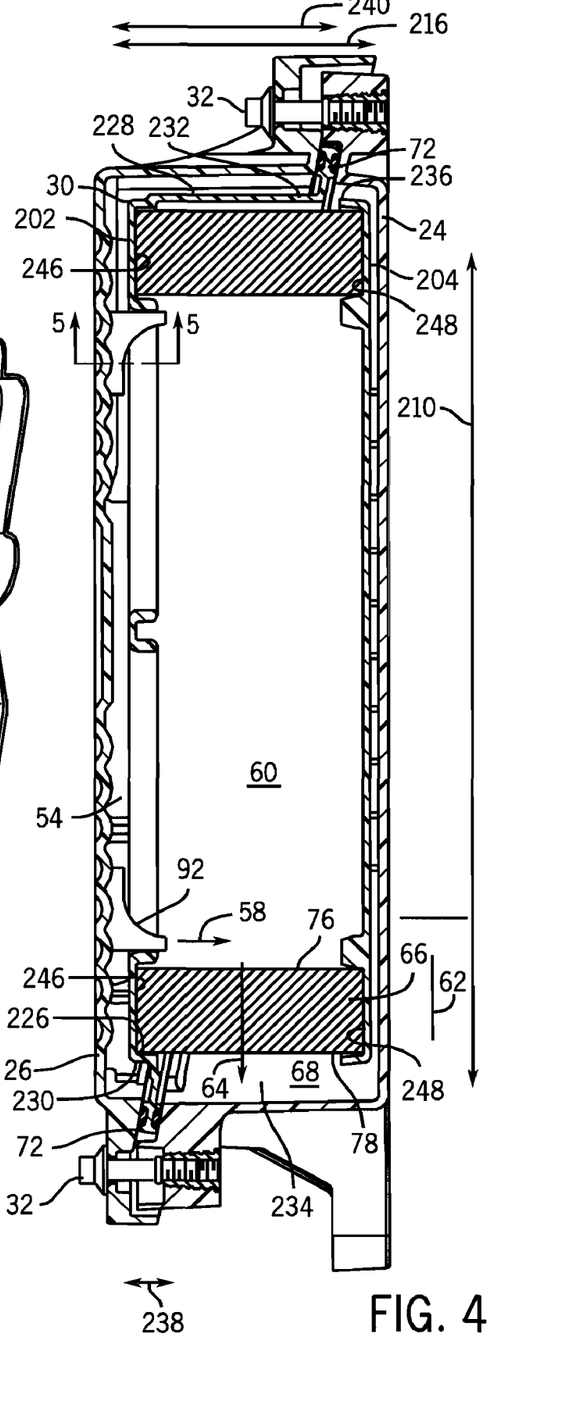
FIG. 4 is a sectional view taken along line 4-4 of FIG. 1.
Figure 5:
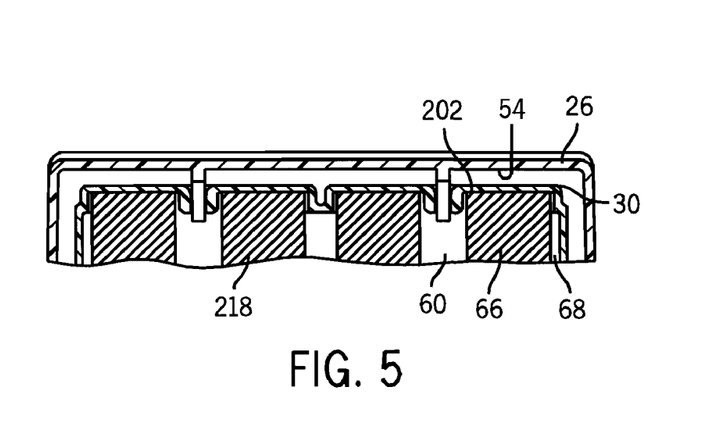
FIG. 5 is a sectional view taken along line 5-5 of FIG. 4.
Figure 6:
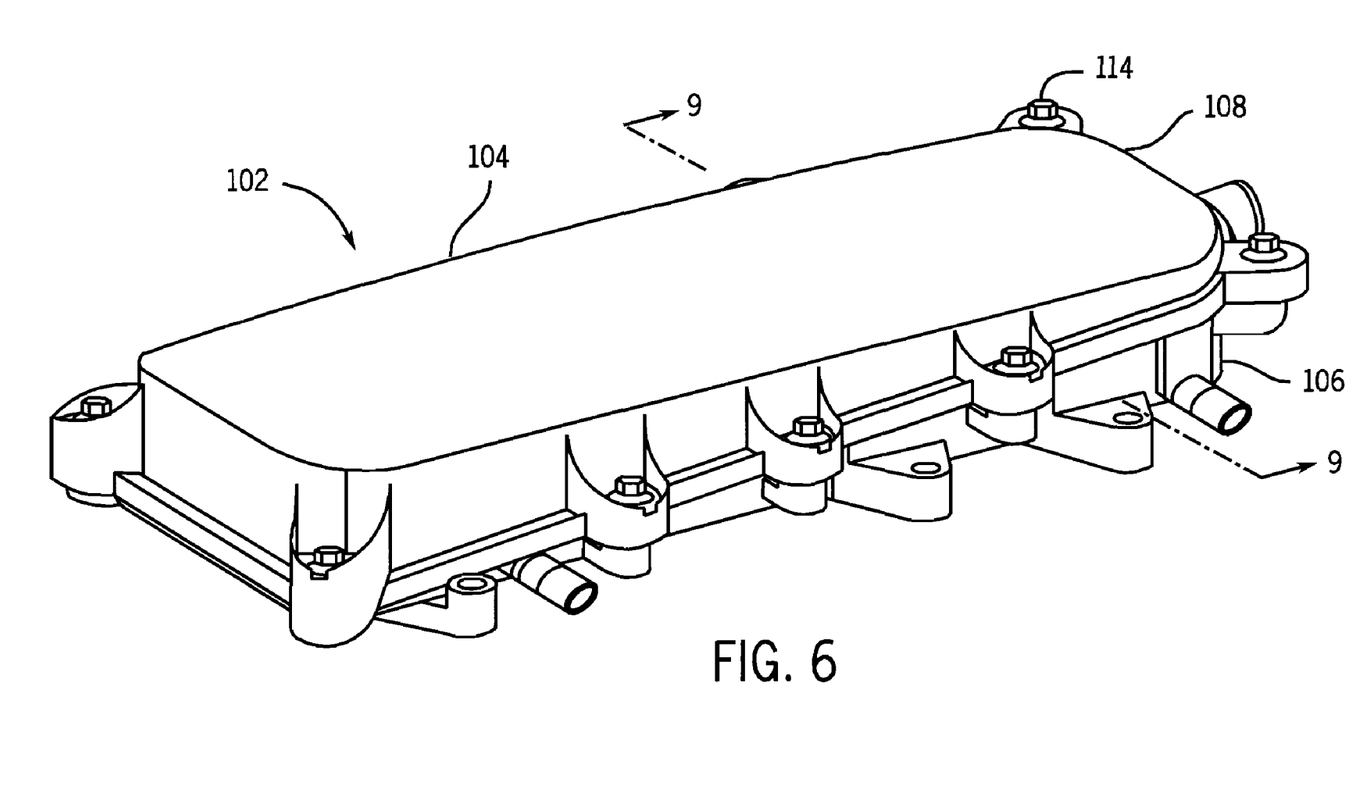
FIG. 6 is like FIG. 1 and shows another embodiment.

FIGS. 2, 4, 5 illustrate a filter element 30 for filtering fluid and includes filter media 66 extending axially along an axial direction 56 between and mounted to first and second axially distally opposite spaced end caps 202 and 204. Filter media 66 and end caps 202 and 204 define a planar member 206 in a lateral plane 208 transverse to axial direction 56. Planar member 206 has a length 210 extending along a first lateral direction 62 along lateral plane 208 and transverse to axial direction 56. Planar member 206 has a width 212 extending along a second lateral direction 214 along lateral plane 208 and transverse to first lateral direction 62 and transverse to axial direction 56. Planar member 206 has an axial height 216 extending along axial direction 56 between end caps 202 and 204. Length 210 is greater than width 212 and substantially greater than axial height 216. In the preferred embodiment, length 210 is substantially greater than axial height 216 by at least a factor of 2 (twice as great), and in further embodiments by a factor of 4 or 5 or more. Filter media 66 has a hollow interior at 60 along which fluid flows axially along axial direction 56 as shown at arrow 58. Filter media 66 has axially extending upstream and downstream faces 76 and 78 laterally spaced from each other and between which fluid flows laterally through the filter media as shown at arrow 64.

In one embodiment, two filter media members 66 and 218 are provided, each having a racetrack shape. Filter media members 66 and 218 extend in parallel side-by-side relation, with the length 210 of each filter media member being greater than the combined widths 212 of both of the filter media members 66 and 218. In one embodiment, two or more filter elements 66, 218 provide longer life.

In a further embodiment, first and second end caps 202 and 204, at filter media receiving portions such as 203, are adhesively bonded or potted or sonically welded or otherwise bonded or affixed to the one or more filter media members and provide a frame supporting the filter media such that the first and second end caps and the filter media form a replaceable filter element unit. First end cap 202 has a border 220 having first and second skirts 222 and 224 extending along the noted first lateral direction 62 and distally oppositely spaced from each other along the noted second lateral direction 214 by filter media 66, 218 therebetween. First end cap 202 has third and fourth skirts 226 and 228 extending along second lateral direction 214 and distally oppositely spaced from each other along first lateral direction 62 by filter media 66, 218 therebetween. First, second, third, fourth skirts 222, 224, 226, 228, respectively, define border 220 surrounding filter media 66, 218. The skirts have differential axial heights relative to each other, defining a variable height border 220. Each skirt extends axially along axial direction 56 between a first axial end and a second axial end. The second axial ends of the skirts face second end cap 204 across a respective axial gap therebetween along one of the upstream and downstream faces of the filter media. For example, second axial ends 230 and 232, FIG. 4, of respective skirts 226 and 228 face second end cap 204 across respective axial gaps 234 and 236 therebetween along downstream face 78 of the filter media. Third skirt 226 has an axial height 238 between its respective first and second axial ends. Fourth skirt 228 has an axial height 240 between its respective first and second axial ends. Axial height 240 of skirt 228 is greater than axial height 238 of skirt 226. The noted first and second skirts 222 and 224 have a tapered axial height as shown at 242, FIG. 2, extending from a minimum axial height at the noted third skirt 226 to a maximum axial height at the noted fourth skirt 228. The noted second axial ends of the first and second skirts 222 and 224 extend along a diagonal taper 244 relative to the noted lateral plane 208. Filter media 66, 218 extends axially along axial direction 56 between first and second distally opposite axial ends 246 and 248, FIG. 4. Second axial end 230 of third skirt 226 is proximate first axial end 246 of the filter media. Second axial end 232 of fourth skirt 228 is proximate second axial end 248 of the filter media. Diagonal gasket 72 extends along the noted second axial ends of first, second, third, fourth skirts 222, 224, 226, 228 of first end cap 202. The noted diagonal taper facilitates ease of service, by requiring only a small separation of cover 26 from base 24 to enable removal of filter element 30 along one or both of the noted lateral directions 62, 214 along lateral plane 208.

In a further embodiment, one of the noted end caps has a side flange extending laterally therefrom, for example end cap 202 having side flange 51 extending laterally therefrom along lateral direction 214. Side flange 51 has the noted one or more windows or openings 52 passing fluid axially therethrough along axial direction 56 and communicating with one of the upstream and downstream faces, for example upstream face 76 as above described. Sealing gasket 72 at segment 72a extends laterally outwardly of the one or more windows 52 such that windows 52 are laterally between the gasket and the filter media. Skirt 222 extends axially from the end cap and is disposed laterally between windows 52 and the filter media.

Figure 9:
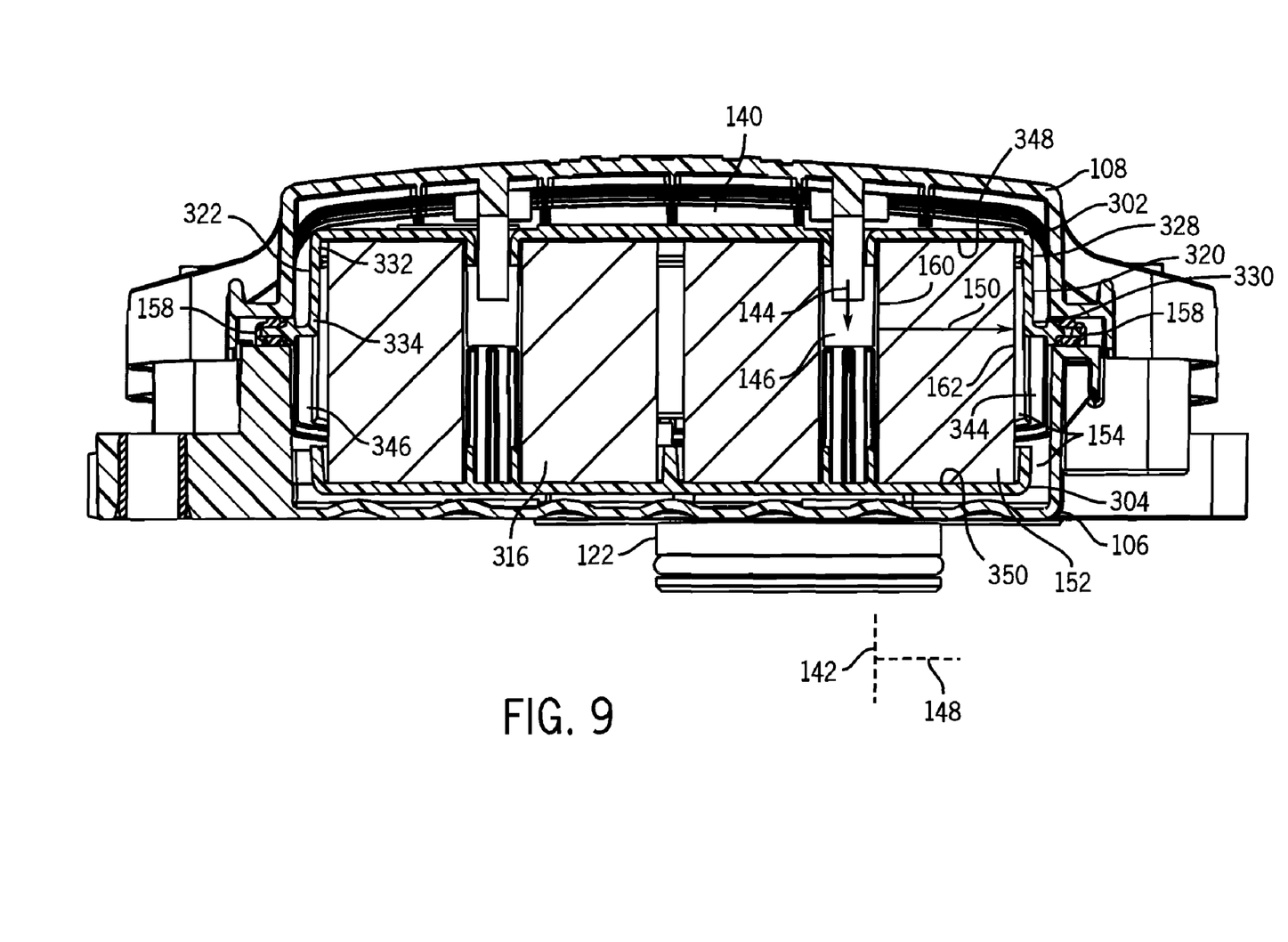
FIG. 9 is a sectional view taken along line 9-9 of FIG. 6.

FIGS. 7 and 9 show a further embodiment at filter element 112 for filtering fluid, including filter media 152 extending axially along axial direction 142 between and mounted to first and second axially distally oppositely spaced end caps 302 and 304. The filter media and the end caps define a planar member 306 in a lateral plane 308 transverse to axial direction 142. Planar member 306 has a length 310 extending along a first lateral direction 164 along the noted lateral plane 308 and transverse to axial direction 142. Planar member 306 has a width 312 extending along a second lateral direction 148 along the noted lateral plane 308 and transverse to axial direction 142 and transverse to the noted first lateral direction 164. Planar member 306 has an axial height 314 extending along axial direction 142 between the noted first and second end caps 302 and 304. Length 310 is greater than width 312 and substantially greater than axial height 314. Filter media 152 has a hollow interior at 146 along which fluid flows axially along axial direction 142 as shown at arrow 144 as above noted. The filter media has axially extending upstream and downstream faces 160 and 162, respectively, laterally spaced from each other and between which fluid flows laterally through the filter media as shown at arrow 150.

In one embodiment, the filter media is provided by two filter media members 152 and 316 each having a racetrack shape. Filter media members 152, 316 extend in parallel side-by-side relation, with the length 310 of each filter media member being greater than the combined lateral widths 312 of both of the filter media members 152, 316. In one embodiment, two or more filter media members 152, 316 provide longer life.

In a further embodiment, first and second end caps 302 and 304, at filter media receiving portions such as 303, are adhesively bonded or potted or sonically welded or otherwise bonded or affixed to the filter media and provide a frame supporting the filter media such that the end caps and the filter media form a replaceable filter element unit. End cap 302 has a border 318 including first and second skirts 320 and 322 extending along first lateral direction 164 and distally oppositely spaced from each other along second lateral direction 148 by filter media 152, 316 therebetween. Border 318 further includes third and fourth skirts 324 and 326 extending along second lateral direction 148 and distally oppositely spaced from each other along first lateral direction 164 by filter media 152, 316 therebetween. First, second, third, fourth skirts 320, 322, 324, 326, respectively, define the noted border 318 and surround filter media 152, 316. The skirts have differential axial heights relative to each other, defining a variable height border 318. Each of the skirts extends axially between a first axial end and a second axial end, for example first and second axial ends 328 and 330 of skirt 320, first and second axial ends 332 and 334 of skirt 322, first and second axial ends 336 and 338 of skirt 324, first and second axial ends 340 and 342 of skirt 326. The second axial ends 330, 334, 338, 342 of the skirts face second end cap 304 across a respective axial gap therebetween along one of the upstream and downstream faces of the filter media. For example, in FIG. 9 the second axial ends 330, 334 of skirts 320, 322 face second end cap 304 across respective axial gaps 344, 346 therebetween along downstream face 162 of the filter media. Third skirt 324 has an axial height between its respective first and second axial ends 336 and 338. Fourth skirt 326 has an axial height between its respective first and second axial ends 340 and 342. The noted axial height of the fourth skirt 326 is greater than the noted axial height of the third skirt 324. The noted first and second skirts 320 and 322 have a tapered axial height, for example as shown at 344, extending from a minimum axial height at third skirt 324 to a maximum axial height at fourth skirt 326. Second axial ends 330 and 334 of the first and second skirts 320 and 322 extend along a diagonal taper 346 relative to the noted lateral plane 308. Filter media 152, 316 extends axially along axial direction 142 between first and second distally opposite axial ends 348 and 350. Second axial end 338 of third skirt 324 is proximate first axial end 348 of the filter media. Second axial end 342 of fourth skirt 326 is proximate second axial end 350 of the filter media. Diagonal gasket 158 extends along second axial ends 330, 334, 338, 342 of first, second, third, fourth skirts 320, 322, 324, 326, respectively, of first end cap 302. In one aspect, the noted diagonal taper facilitates ease of service, by requiring only a small separation of cover 108 from base 106 to enable removal of filter element 112 along one or both of the noted lateral directions 148, 164 along lateral plane 308.

In a further embodiment, one of the end caps, for example end cap 302, has a tubular port, for example port 130 through which fluid communicates with one of the upstream and downstream faces of the filter media, for example upstream face 160. Tubular port 130 in end cap 302 is spaced along one of the noted first and second lateral directions, for example lateral direction 164, from the filter media and is external of the noted hollow interior 146 thereof. Fluid flows axially along axial direction 142 through tubular port 130 parallel to fluid flow in hollow interior 146. In one embodiment, fluid flows through tubular port along a first direction, for example upwardly in FIG. 7 as shown at arrow 352, and fluid flows through hollow interior 146 along a second axial direction as shown at arrow 144, which second axial direction 144 is opposite to the noted first axial direction 352. An annular sealing gasket 354 is provided at tubular port 130 for sealed connection to a connecting component such as inlet 122 of base 106 or another tubular port extending therealong. Annular sealing gasket 354 lies in a plane extending parallel to lateral plane 308.

In a further embodiment, one of the end caps, for example end cap 302, has first and second tubular ports 130 and 356 extending axially therethrough and through which fluid communicates with one of the upstream and downstream faces of the filter media, for example upstream face 160. First and second tubular ports 130 and 356 are laterally spaced from each other and laterally spaced from filter media 152, 316 and are external of hollow interior 146 thereof. In one embodiment, first and second tubular ports 130 and 356 are laterally spaced from filter media 152, 316 along the noted first lateral direction 164, and the first and second tubular ports 130 and 356 are laterally spaced from each other along the noted second lateral direction 148.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. The structure and methodology herein may be used beyond internal combustion engine crankcase ventilation filter applications to other filter applications and filter elements therefor.

What is claimed is:

1. A filter element for filtering fluid comprising filter media extending axially along an axial direction between and mounted and directly attached to first and second axially distally oppositely spaced end caps defining a planar member in a lateral plane transverse to said axial direction said planar member having a length extending along a first lateral direction along said lateral plane and transverse to said axial direction, said planar member having a width extending along a second lateral direction along said later plane and transverse to said axial direction and transverse to said first lateral direction, said planar member having an axial height extending along said axial direction between said first and second end caps, said length being greater than said width and substantially greater than said axial height said filter media being looped back upon itself to define a close-loop configuration having a hollow interior along which fluid flows axially along said axial direction said filter media having axially extending upstream and downstream faces laterally spaced from each other and between which fluid flows laterally through said filter media;

wherein at least one of said first and second end caps provides a frame supporting said filter media such that said one end cap and said filter media form a replaceable filter element unit;

wherein said first end cap comprises a border comprising:

first and second skirts extending along said first lateral direction and distally oppositely spaced from each other along said second lateral direction by said filter media therebetween; and third and fourth skirts extending along said second lateral direction and distally oppositely spaced from each along said first lateral direction by said filter media therebetween;

wherein each of said skirts extends axially between a first axial end and a second axial end;

said second axial ends of said skirts face said second end cap across a respective axial gap therebetween along one of said upstream and downstream faces of said filter media;

said third skirt has an axial height between its respective first and second axial ends;

said fourth skirt has an axial height between its respective said first and second axial ends;

said axial height of said fourth skirt is greater than said axial height of said third skirt;

said first and second skirts have a tapered axial height extending from a minimum axial height at said third skirt to a maximum axial height at said fourth skirt;

said second axial ends of said first and second skirts extend along a diagonal taper relative to said lateral plane; and wherein one of said end caps has a side flange extending laterally therefrom said flange having one or more windows passing fluid axially therethrough and communicating with one of said upstream and downstream faces.

2. The filter element according to claim 1 comprising two filter media members each having a racetrack shape.

3. The filter element according to claim 2 wherein said filter media members extend in parallel side-by-side relation.

4. The filter element according to claim 3 wherein the length of each filter media member is greater than the combined widths of both of said filter media members.

5. The filter element according to claim 1 wherein said first and second end caps provide said frame supporting said filter media such that said first and second ends caps and said filter media form a replaceable filter element unit.

6. The filter element according to claim 1 wherein said first, second, third and fourth skirts define said border surrounding said filter media.

7. The filter element according to claim 1 wherein said skirts have differential axial heights relative to each other, defining a variable height said border.

8. The filter element according to claim 1 wherein:

said filter media extends axially between first and second distally opposite axial ends;

said second axial end of said third skirt is proximate said first axial end of said filter media; and said second axial end of said fourth skirt is proximate said second axial end of said filter media.

9. The filter element according to claim 1 comprising a gasket extending along said second axial ends of said first, second, third and fourth skirts of said first end cap.

10. The filter element according to claim 1 wherein filter media extends axially between first and second distally opposite axial ends, said one end cap has a skirt portion extending axially from said first axial end of said filter media to said side flange such that said one or more windows are axially spaced from said first axial end of said filter media, and such that said one or more windows and said first axial end of said filter media lie in different lateral planes axially spaced from each other.

11. The filter element according to claim 1 wherein said side flange extends laterally along said second lateral direction from said one end cap.

12. The filter element according to claim 1 wherein:
at least one of said first and second end caps provides a frame supporting said filter media such that said one end cap and said filter media form a replaceable filter element unit;
said first end cap comprises a border comprising:
first and second skirts extending along said first lateral direction and distally oppositely spaced from each other along said second lateral direction by said filter media therebetween; and
third and fourth skirts extending along said second lateral direction and distally oppositely spaced from each along said first lateral direction by said filter media therebetween;
said side flange extends laterally along said second lateral direction from said first skirt.

13. The filter element according to claim 1 comprising a sealing gasket extending along said one end cap laterally outwardly of said one or more windows such that said one or more windows are laterally between said gasket and said filter media, and comprising a skirt extending axially from said one end cap and disposed laterally between said one or more windows and said filter media.

14. The filter element according to claim 1 wherein one of said end caps has a tubular port through which fluid communicates with one of said upstream and downstream faces.

15. The filter element according to claim 14 wherein said tubular port in said one end cap is spaced along one of said first and second lateral directions from said filter media and is external of said hollow interior thereof.

16. The filter element according to claim 15 wherein fluid flows axially through said tubular port parallel to fluid flow in said hollow interior.

17. The filter element according to claim 16 wherein fluid flows through said tubular port along a first axial direction, and fluid flows through said hollow interior along a second axial direction opposite to said first axial direction.

18. The filter element according to claim 16 comprising an annular sealing gasket at said tubular port for sealed connection to a connecting component, said annular sealing gasket lying in a plane parallel to said lateral plane.

19. The filter element according to claim 1 wherein:
one of said end caps has first and second tubular ports extending axially therethrough and through which fluid communicates with one of said upstream and downstream faces; and
said first and second tubular ports are laterally spaced from each other and laterally spaced from said filter media and external of said hollow interior thereof.

20. The filter element according to claim 19 wherein:
said first and second tubular ports are laterally spaced from said filter media along said first lateral direction;
said first and second tubular ports are laterally spaced from each other along said second lateral direction.

21. An end cap for a filter element having filter media looped back upon itself to define a close-loop configuration and mounted and directly attached to said end cap, said filter element comprising a planar member lying in lateral plane transverse to an axial direction, said planar member having a length extending along a first lateral direction along said lateral plane and transverse to said axial direction, said planar member having a width extending along a second lateral direction along said later plane and transverse to said axial direction and transverse to said first lateral direction;
wherein said end cap provides a frame supporting said filter media such that said end cap and said filter media form a replaceable filter element unit;
wherein said end cap comprises a border comprising:
first and second skirts extending along said first lateral direction and distally oppositely spaced from each other along said second lateral direction by said filter media therebetween; and
third and fourth skirts extending along said second lateral direction and distally oppositely spaced from each along said first lateral direction by said filter media therebetween;
wherein each of said skirts extends axially between a first axial end and a second axial end;
said second axial ends of said skirts face a second end cap across a respective axial gap therebetween along one of said upstream and downstream faces of said filter media;
said third skirt has an axial height between its respective first and second axial ends;
said fourth skirt has an axial height between its respective said first and second axial ends;
said axial height of said fourth skirt is greater than said axial height of said third skirt;
said first and second skirts have a tapered axial height extending from a minimum axial height at said third skirt to a maximum axial height at said fourth skirt;
said second axial ends of said first and second skirts extend along a diagonal taper relative to said lateral plane; and
wherein one of said end caps has a side flange extending laterally therefrom said flange having one or more windows passing fluid axially therethrough and communicating with one of said upstream and downstream faces.

22. The end cap according to claim 21 wherein said end cap has a filter media receiving portion, and wherein said first, second, third and fourth skirts define said border surrounding said filter media receiving portion.

23. The end cap according to claim 21 wherein said skirts have differential axial heights relative to each other, defining a variable height said border.

24. The end cap according to claim 21 wherein:
each of said skirts extends axially between a first axial end and a second axial end;
said third skirt has an axial height between its respective said first and second axial ends;
said fourth skirt has an axial height between its respective said first and second axial ends;
said axial height of said fourth skirt is greater than said axial height of said third skirt;

said first and second skirts have a tapered axial height extending from a minimum axial height at said third skirt to a maximum axial height at said fourth skirt;
said second axial ends of said first and second skirts extend along a diagonal taper relative to said lateral plane.

25. The end cap according to claim 21 wherein said end cap has a filter media receiving portion for receiving filter media extending axially between first and second distally opposite axial ends and attached to said end cap at said first axial end, said second axial end of said third skirt being proximate said first axial end of said filter media, said second axial end of said fourth skirt being proximate said second axial end of said filter media.

26. The end cap according to claim 24 comprising a gasket extending along said second axial ends of said first, second, third and fourth skirts of said end cap.

27. An end cap for a filter element having filter media looped back upon itself to define a close-loop configuration and mounted and directly attached to said end cap, said end filter element comprising a planar member lying in lying in lateral plane transverse to an axial direction, said planar member having a length extending along a first lateral direction along said lateral plane and transverse to said axial direction, said planar member having a width extending along a second lateral direction along said lateral plane and transverse to said axial direction and transverse to said first lateral direction;
wherein said end cap provides a frame supporting said filter media such that said end cap and said filter media form a replaceable filter element unit;
wherein said end cap comprises a border comprising:
first and second skirts extending along said first lateral direction and distally oppositely spaced from each other along said second lateral direction by said filter media therebetween; and
third and fourth skirts extending along said second lateral direction and distally oppositely spaced from each along said first lateral direction by said filter media therebetween;
wherein each of said skirts extends axially between a first axial end and a second axial end;
said second axial ends of said skirts face a second end cap across a respective axial gap therebetween along one of said upstream and downstream faces of said filter media;
said third skirt has an axial height between its respective first and second axial ends;
said fourth skirt has an axial height between its respective said first and second axial ends;
said axial height of said fourth skirt is greater than said axial height of said third skirt;
said first and second skirts have a tapered axial height extending from a minimum axial height at said third skirt to a maximum axial height at said fourth skirt;
said second axial ends of said first and second skirts extend along a diagonal taper relative to said lateral plane; and
wherein one of said end caps has a side flange extending laterally therefrom said flange having one or more windows passing fluid axially therethrough and communicating with one of said upstream and downstream faces.

28. The end cap according to claim 27 wherein said end cap has a filter media receiving portion for receiving filter media extending axially between first and second distally opposite axial ends, and said end cap has a skirt portion extending axially from said first axial end of said filter media to said side flange such that said one or more windows are axially spaced from said first axial end of said filter media, and such that said one or more windows and said first axial end of said filter media lie in different lateral planes axially spaced from each other.

29. The end cap according to claim 27 wherein said side flange extends laterally along said second lateral direction from said end cap.

30. The end cap according to claim 27 comprising a sealing gasket extending along said end cap laterally outwardly of said one or more windows, and wherein said end cap comprises an axially extending skirt laterally adjacent said one or more windows such that said one or more windows are laterally between said gasket and said skirt.

31. An end cap for a filter element having filter media looped back upon itself to define a close-loop configuration and mounted and directly attached to said end cap, said filter element comprising a planar member lying in lateral plane transverse to an axial direction, said planar member having a length extending along a first lateral direction along said lateral plane and transverse to said axial direction, said planar member having a width extending along a second lateral direction along said lateral plane and transverse to said axial direction and transverse to said first lateral direction, said end cap having a filter media receiving portion, said end cap having a tubular port spaced along one side of said first and second lateral direction from said filter media receiving portion;
wherein said end cap provides a frame supporting said filter media such that said end cap and said filter media form a replaceable filter element unit;
wherein said end cap comprises a border comprising:
first and second skirts extending along said first lateral direction and distally oppositely spaced from each other along said second lateral direction by said filter media therebetween; and
third and fourth skirts extending along said second lateral direction and distally oppositely spaced from each along said first lateral direction by said filter media therebetween;
wherein each of said skirts extends axially between a first axial end and a second axial end;
said second axial ends of said skirts face a second end cap across a respective axial gap therebetween along one of said upstream and downstream faces of said filter media;
said third skirt has an axial height between its respective first and second axial ends;
said fourth skirt has an axial height between its respective said first and second axial ends;
said axial height of said fourth skirt is greater than said axial height of said third skirt;
said first and second skirts have a tapered axial height extending from a minimum axial height at said third skirt to a maximum axial height at said fourth skirt;
said second axial ends of said first and second skirts extend along a diagonal taper relative to said lateral plane; and
wherein one of said end caps has a side flange extending laterally therefrom said flange having one or more windows passing fluid axially therethrough and communicating with one of said upstream and downstream faces.

32. The end cap according to claim 31 wherein fluid flows along an axial direction toward or away from said filter media receiving portion, and wherein fluid flows axially through said tubular port parallel to said axial direction.

33. The end cap according to claim 31 wherein said filter media receiving portion receives filter media having a hollow interior, and wherein fluid flows axially through said tubular port parallel to fluid flow in said hollow interior.

34. The end cap according to claim 33 wherein fluid flows through said tubular port along a first axial direction, and fluid flows through said hollow interior along a second axial direction opposite to said first axial direction.

35. The end cap according to claim 31 comprising an annular sealing gasket at said tubular port for sealed connection to a connecting component, said annular gasket lying in a plane parallel to said lateral plane.

36. The end cap according to claim 31 wherein said tubular port is a first tubular port extending axially through said end cap, and comprising a second tubular port extending axially through said end cap, said first and second tubular ports being laterally spaced from each other.

37. The end cap according to claim 36 wherein said end cap has a filter media receiving portion, and wherein said first and second tubular ports are laterally spaced from said filter media receiving portion.

38. The end cap according to claim 37 wherein said first and second tubular ports are laterally spaced from said filter media receiving portion along said first lateral direction, and said first and second tubular ports are laterally spaced from each other along said second lateral direction.

* * * * *